(12) United States Patent
Heo et al.

(10) Patent No.: US 8,913,518 B2
(45) Date of Patent: Dec. 16, 2014

(54) ENHANCED NODE B, USER EQUIPMENT AND METHODS FOR DISCONTINUOUS RECEPTION IN INTER-ENB CARRIER AGGREGATION

(71) Applicant: Intel Corporation, Santa Clara, CA (US)

(72) Inventors: Youn Hyoung Heo, Seoul (KR); Yujian Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 128 days.

(21) Appl. No.: 13/729,117

(22) Filed: Dec. 28, 2012

(65) Prior Publication Data

US 2014/0185467 A1    Jul. 3, 2014

Related U.S. Application Data

(60) Provisional application No. 61/679,627, filed on Aug. 3, 2012.

(51) Int. Cl.

| | |
|---|---|
| *H04J 1/16* | (2006.01) |
| *H04J 3/14* | (2006.01) |
| *H04L 1/00* | (2006.01) |
| *H04L 12/26* | (2006.01) |
| *G01R 31/08* | (2006.01) |
| *G06F 11/00* | (2006.01) |
| *G08C 15/00* | (2006.01) |
| *G08C 17/00* | (2006.01) |
| *H04W 4/00* | (2009.01) |
| *H04W 72/04* | (2009.01) |
| *H04W 52/02* | (2009.01) |

(52) U.S. Cl.
CPC .............. *H04W 52/02* (2013.01); *H04W 72/04* (2013.01)
USPC ............ 370/252; 370/311; 370/329; 370/341

(58) Field of Classification Search
None
See application file for complete search history.

(56) References Cited

U.S. PATENT DOCUMENTS 8,755,316 B2 * 6/2014 Aschan et al. ................ 370/311
2009/0016232 A1    1/2009 Kwon et al.
(Continued)

FOREIGN PATENT DOCUMENTS

| KR | 1020110052426 A | 5/2011 |
|---|---|---|
| KR | 1020120070444 A | 6/2012 |

(Continued)

OTHER PUBLICATIONS

"U.S. Appl. No. 14/124,984, Preliminary Amendment filed Dec. 9, 2013", 11 pgs.

(Continued)

*Primary Examiner* — Shaq Taha
*Assistant Examiner* — Kodzovi Acolatse
(74) *Attorney, Agent, or Firm* — Schwegman Lundberg & Woessner, P.A.

(57) ABSTRACT

Embodiments of user equipment (UE) and methods for enhanced discontinuous reception (DRX) operations for inter eNB carrier aggregation (CA) in an LTE network are generally described herein. In some embodiments, a UE is configured to be served by multiple serving cells. The first set of the serving cells may be associated with a first eNB and a second set of serving cells may be associated with a second eNB. In these embodiments, DRX operations may be performed independently in multiple serving cells belonging to the different eNBs. Other embodiments for enhanced DRX operations are also described.

4 Claims, 2 Drawing Sheets

(56) References Cited

U.S. PATENT DOCUMENTS

| | | |
|---|---|---|
| 2010/0009675 A1 | 1/2010 | Wijting et al. |
| 2010/0009690 A1 | 1/2010 | Jin et al. |
| 2010/0110897 A1 | 5/2010 | Chun et al. |
| 2010/0317345 A1* | 12/2010 | Futaki et al. ............ 455/436 |
| 2011/0134774 A1 | 6/2011 | Pelletier et al. |
| 2011/0170420 A1 | 7/2011 | Xi et al. |
| 2011/0268006 A1 | 11/2011 | Koskela et al. |
| 2012/0057476 A1 | 3/2012 | Chan et al. |
| 2012/0106517 A1 | 5/2012 | Charbit et al. |
| 2012/0155355 A1 | 6/2012 | Kwon et al. |
| 2012/0176950 A1* | 7/2012 | Zhang et al. ............ 370/311 |
| 2013/0250910 A1* | 9/2013 | Liao et al. ............ 370/331 |
| 2014/0171091 A1* | 6/2014 | Cai et al. ............ 455/450 |

FOREIGN PATENT DOCUMENTS

| | | |
|---|---|---|
| WO | WO-2012056209 A1 | 5/2012 |
| WO | WO-2012068731 A1 | 5/2012 |

OTHER PUBLICATIONS

"U.S. Appl. No. 14/126,983, Preliminary Amendment filed Dec. 17, 2013", 8 pgs.

"Evolved Universal Terrestrial Radio Access (E-UTRA); Radio Resource Control (RRC); Protocol specification", 3GPP TS 36.331 V11.5.0. Technical Specification Group Radio Access Network. Release 11., (Sep. 2013), 347 pgs.

"International Application Serial No. PCT/US2013/053428, International Search Report mailed Dec. 19, 2013", 4 pgs.

"International Application Serial No. PCT/US2013/053428, Written Opinion mailed Dec. 19, 2013", 8 pgs.

"International Application Serial No. PCT/US2013/053470, International Search Report mailed Nov. 21, 2013", 3 pgs.

"International Application Serial No. PCT/US2013/053470, Written Opinion mailed Nov. 21, 2013", 4 pgs.

Ericson, Juniper, et al., "Device triggering procedure", 3GPP TSG-CT WG3 Meeting #69. C3-120956., [Online] retrieved from the internet: <http://v9ww.3gpp.org/ftp/tsg_ct/WG3_interworking_ex-CN3/TSGC3_69JKyoto/Docs/>, (May 21, 2012), 4 pgs.

"Evolved Universal Terrestrial Radio Access (E-UTRA); Medium Access Control (MAC) protocol specification", 3GPP TS 36.321 V10.5.0. Technical Specification Group Radio Access Network. Release 10., (Mar. 2012), 54 pgs.

"International Application Serial No. PCT/US2013/044139, International Search Report mailed Sep. 16, 2013", 3 pgs.

"International Application Serial No. PCT/US2013/044139, Written Opinion mailed Sep. 16, 2013", 5 pgs.

* cited by examiner

ENHANCED NODE B, USER EQUIPMENT AND METHODS FOR DISCONTINUOUS RECEPTION IN INTER-ENB CARRIER AGGREGATION

PRIORITY CLAIM

This application claims priority under 35 U.S.C. 119 to U.S. Provisional Patent Application Ser. No. 61/679,627, filed Aug. 3, 2012, which is incorporated herein by reference in its entirety.

TECHNICAL FIELD

Embodiments pertain to wireless communications. Some embodiments relate to discontinuous reception in wireless networks, such as Evolved Universal Terrestrial Radio Access (E-UTRA) networks (EUTRANs) operating in accordance with one of the 3GPP standards for the Long Term Evolution (LTE) (3GPP LTE).

BACKGROUND

One issue with many conventional cellular networks, including conventional LTE networks, is frequent handover, particularly in heterogeneous deployment scenarios that include macro-cells and pico-cells. For example, a primary cell (PCell) may be served from a macro-cell and a secondary cell (SCell) may be served from a pico-cell. Since the coverage of a pico-cell may be much smaller than that of a macro-cell, user equipment (UE) may need to handover to a macro-cell or another pico-cell if the UE is connected only to the pico-cell. On the other hand, if the UE is connected to the macro-cell, handover may not be required, however offloading to the pico-cell would not be provided. To achieve offloading and reduce the frequency of handover, carrier aggregation (CA) between a macro-cell and pico-cell may be performed. In conventional LTE systems, CA is only supported between cells in the same enhanced Node B (eNB). However, macro-cells and pico-cells in a heterogeneous deployment scenario may be associated with different eNBs.

In order to reduce power consumption, a UE may engage in discontinuous reception (DRX) operations during which the UE may be configured to receive a control channel during certain periods of time. The use of CA presents several issues for DRX operations particularly when a macro-cell and a pico-cell are served by different eNBs. For example, when serving cells are associated with different eNBs, it becomes difficult for a UE to determine the control channel reception times as well as other DRX related parameters. Other issues associated with the use of CA for DRX operations when serving cells are associated with different eNBs include uplink scheduling, random access and transmission of a buffer status report (BSR).

Thus there are general needs for devices and methods that reduce address the issues associated with DRX during inter-eNB CA, particularly serving cells are associated with different eNBs.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
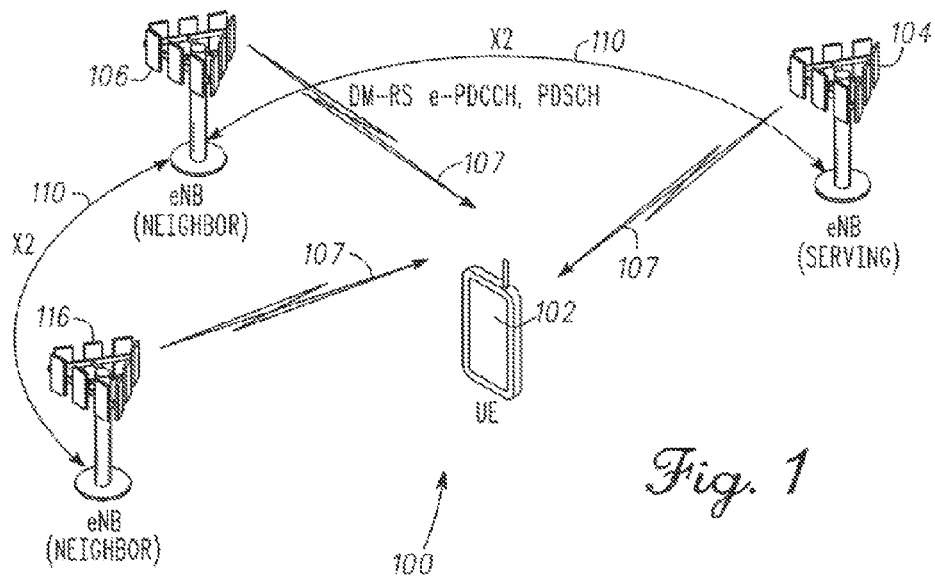
FIG. 1 illustrates a wireless network in accordance with some embodiments.

FIG. 1 illustrates a wireless network in accordance with some embodiments. Wireless network 100 includes user equipment (UE) 102 and a plurality of enhanced node Bs (eNBs) 104, 106 and 116. The eNBs may provide communication services to UEs, such as UE 102. The eNB 104 may be a serving eNB when the UE 102 is located with a region served by eNB 104. The eNBs 106, 116 may be neighbor eNBs. Each eNB may be associated with a set of one or more serving cells that may include macro-cells and pico-cells.

In some of these embodiments, eNB 104 and eNB 106 may engage in inter-eNB carrier aggregation (CA), although the scope of the embodiments is not limited in this respect. For inter-eNB CA two or more component carriers of different cells may be aggregated to serve a single UE (i.e., UE 102). For example, the UE 102 may receive resource blocks of the same downlink channel 107 from two or more eNBs (e.g., eNB 104, eNB 106, and eNB 116).

In some embodiments, the downlink channel 107 that the UE 102 may receive from two or more eNBs may be a physical downlink shared channel (PDSCH). In some embodiments, the downlink channel 107 that the UE 102 may receive from two or more eNBs may be a physical downlink control channel (PDCCH). In some embodiments, UE 102 may be configured for coordinated multi-point (CoMP) operations in which one or more downlink channels 107 are at least partially offloaded from a serving eNB 104 to one or more neighbor eNBs 106, 116.

Figure 2:
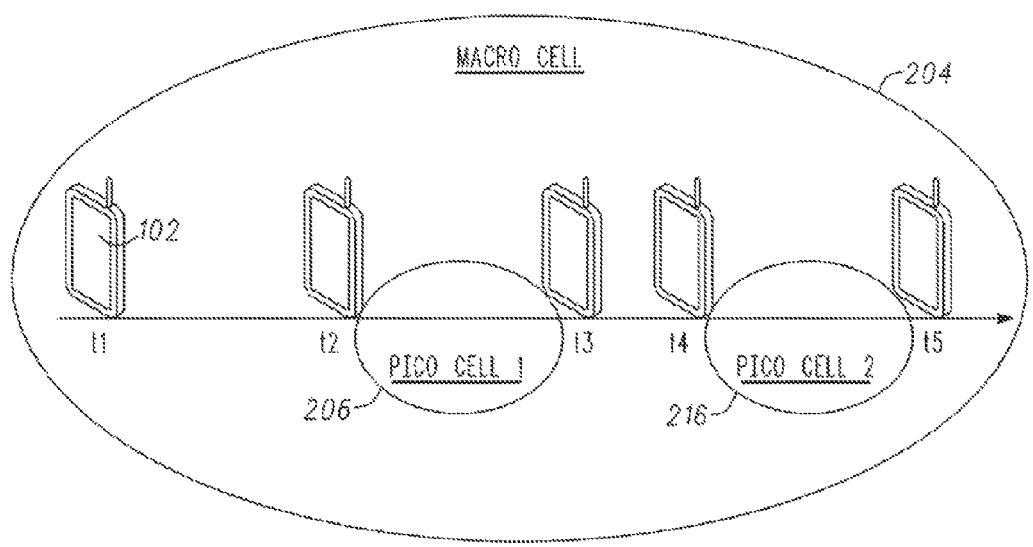
FIG. 2 illustrates an example inter-eNB CA deployment scenario in accordance with some embodiments.

FIG. 2 illustrates an example inter-eNB CA deployment scenario in accordance with some embodiments. In these embodiments during which inter-eNB CA is performed, rather than a handover process, a secondary cell addition-removal process may be performed as the UE 102 transitions among secondary cells 206, 216 within a primary cell 204. In these embodiments, data may be offloaded from the primary cell 204 to one or more of secondary cells 206, 216 helping to reduce the bandwidth requirements of the primary cell 204. In the example illustrated in FIG. 2, the primary cell 204 may be a macro-cell and the secondary cells 206, 216 may be pico-cells, however this is not a requirement. As shown in FIG. 2, UE 102 may be served by macro-cell 204 at time t1, may add pico-cell 206 at time t2, may remove pico-cell at time t3, may add pico-cell 216 at time t4, and may remove pico-cell 216 at time t5.

In accordance with some embodiments, DRX operations may be performed independently in multiple serving cells belonging to the different eNBs. In these embodiments, the UE 102 may be configured for DRX operations and may be served by multiple serving cells including a primary cell (PCell) and one or more secondary cells (SCell). A first set of the serving cells being associated with a first eNB 104 and a second set of serving cells being associated with a second eNB 106. In these embodiments, the UE 102 may be configured with DRX parameters for a first DRX operation for the serving cells of the first set. The DRX parameters for the first DRX operation may be the same for all serving cells of the first set. The 102 may be configured with DRX parameters for a second DRX operation for the serving cells of the second set. The DRX parameters for the second DRX operation may have at least a same/common active time for DRX operation. The UE 102 may determine a first active time, based on the first DRX parameters, in which the UE 102 is to monitor a control channel (e.g., the PDCCH) of the serving cells of the first set based on the first DRX parameters. The UE 102 may determine a second active time, based on the second DRX parameters, in which the UE 102 is to monitor a control channel (e.g., the PDCCH) of the serving cells of the second set.

In these embodiments, DRX operations may be managed fully independent in multiple serving cells. The active time may be managed independently with the different DRX related parameters. The UE 102 may monitor the PDCCH in the different subframes depending on the serving cells in the different eNB. The UE 102 can receive the different DRX related parameters for the serving cells. In these embodiments, the same DRX related parameters and active time are applied for serving cells associated to the same eNB.

In some of these embodiments, the first eNB 104 and the second eNB 106 may communicate over an X2 interface 110. Since a different DRX configuration may be applied for the serving cells in the different eNBs, any delay over the X2 110 interface does not affect DRX operations. In these embodiments, all DRX parameters may be the same for serving cells belonging to the same eNB. Different DRX parameters may be used for serving cells belonging to different eNBs.

In some embodiments, the serving cells of the first set (e.g., the serving cells associated with the first eNB 104) may comprise an eNB specific cell group (ECG) (i.e., a first ECG). The serving cells of the second set (e.g., the serving cells associated with the second eNB 106) may also comprise an ECG (i.e., a second ECG). An ECG may refer to a set of serving cells associated to a single eNB.

In some embodiments, when some of the serving cells are provided different eNBs, the UE 102 may monitor the PDCCH in different subframes for serving cells associated with the first and second eNBs to receive the first and second DRX parameters. Since some of the serving cells are provided by different eNBs, the UE 102 monitors the PDCCH in different subframes for the serving cells of the different eNBs to receive the DRX parameters.

In some embodiments, the active time for serving cells of each set includes time while one or more timers associated with the serving cells of the set are running. The timers may include an on-duration time, a DRX-inactivity timer, a DRX-retransmission timer, and a MAC contention-resolution timer. In these embodiments, the active time of serving cells of each set may be defined with different timers.

In some embodiments, the active time for serving cells for each set may further include time while a scheduling request sent by the UE 102 on a physical uplink control channel (PUCCH) in one of the serving cells of that set is pending. Accordingly, each set of serving cells may have a different active time. In these embodiments, the UE 102 may be configured to send a scheduling request on the PUCCH in one of the serving cells.

In some embodiments, the active time further includes time while an uplink grant for a pending hybrid-automatic repeat request (HARQ) retransmission can occur and there is data in a corresponding HARQ buffer of one of the serving cells of that set. In some embodiments, for a primary cell associated with the first eNB 104, the active time may also include time while PDCCH indicating a new transmission addressed to the UE 102 has not been received after reception of a random access response for a preamble not selected by the UE 102.

As discussed above, when the eNBs are engaged in inter-eNB CA, the UE 102 may receive a downlink channel from two or more eNBs. In these embodiments, the UE 102 may process aggregated component carriers of the different serving cells of a set in single FFT operations, although this is not a requirement. In these embodiments, the component carriers may be continuous or discontinuous in frequency.

In some embodiments, the UE 102 may receive a radio-resource control (RRC) message at connection establishment from a serving eNB 104. The message may indicate the DRX parameters for each set of serving cells. The UE 102 may perform to a DRX operation for each set of serving cells based on different sets of DRX parameters. In some embodiments, a single RRC message by the serving eNB may be used to indicate the DRX parameters for both sets of serving cells. In other embodiments, separate RRC messages may be used.

In these embodiments, the serving eNB 104 may send an RRC message to the UE 102 at connection establishment to indicate the DRX parameters per a set of serving cells belonging to the same eNB. The UE 102 may perform DRX operations in each serving cell belonging to the same eNB.

In some embodiments, each eNB may transmit a message to indicate the DRX parameters for the serving cells associated with said eNB. In some embodiments, the message may be a DRX-config-sECG message.

The following shows the example of RRC signaling to configure different DRX parameters for multiple eNBs. The current DRX parameters can be used for the eNB including the PCell. For the eNB not including the PCell, a DRX-Config-sECG may be used. Although the active time is applied independently and DRX related timers are managed independently per ECG, the same or different value for the DRX related timers can be configured. In this case, the following new parameters may not be needed.

```
DRX-Config ::= CHOICE {
release NULL,
setup SEQUENCE {
onDurationTimer ENUMERATED {
psf1, psf2, psf3, psf4, psf5, psf6,
psf8, psf10, psf20, psf30, psf40,
psf50, psf60, psf80, psf100,
psf200},
....
}
DRX-Config-sECG ::= CHOICE {
release NULL,
setup SEQUENCE {
onDurationTimer ENUMERATED {
psf1, psf2, psf3, psf4, psf5, psf6,
psf8, psf10, psf20, psf30, psf40,
psf50, psf60, psf80, psf100,
psf200},
....
```

In some embodiments, the active time for DRX operation is the time during which the UE monitors the PDCCH in PDCCH-subframes. The On Duration Timer specifies the number of consecutive PDCCH-subframe(s) at the beginning of a DRX Cycle. The DRX-Inactivity Timer specifies the number of consecutive PDCCH-subframe(s) after successfully decoding a PDCCH indicating an initial uplink (UL) or downlink (DL) user data transmission for this UE. The DRX Retransmission Timer specifies the maximum number of consecutive PDCCH-subframe(s) for as soon as a DL retransmission is expected by the UE. The MAC-contention resolution timer specifies the number of consecutive subframe(s) during which the UE shall monitor the PDCCH after an Msg3 is transmitted. In some LTE embodiments, Msg3 may carry the RRC connection request message from UE as part of a random access procedure utilizing a random access channel (RACH).

In some embodiments, a DRX cycle includes at least an on-duration time and a DRX cycle length. The on-duration time may be the period of time (i.e., the active time) of the DRX cycle length during which the UE 102 is configured to monitor the PDCCH. The DRX cycle length indicates a periodic repetition for a DRX cycle that includes the on-duration time followed by an opportunity for DRX time during which the UE is in a low-power state and does not transmit or receive data. The DRX parameters may include the on-duration time and a DRX cycle length. The DRX parameters may also include an inactivity time.

In some embodiments, DRX operations may be managed partially independently in multiple serving cells. In these embodiments, when active time operations are unrelated to instantaneous PDCCH reception or HARQ status, the active time operation remains the same (i.e., synchronized between the serving cells). For example the active time of serving cells may be configured to be common between of the first and second sets (i.e., the active times are synchronized and applied commonly to all serving cells). When the active time operations are related to instantaneous PDCCH reception or HARQ status, the active times for the serving cells of the first set and for the serving cells of the second set may be independently determined by the first and second eNBs 104, 106 (i.e., the active time operations are managed independently per eNB, not applied commonly and not necessary synchronized).

Table 1 shows examples of active time management in inter-eNB CA in accordance with some embodiments. The event column refers to when the active time is enabled. Each event may be started when the condition described in the second column is met. The third column describes whether the active time due to the corresponding event is commonly applied to all serving cells or independently applied for serving cells of a different eNB. Even in case of independent active time management, the active time may be applied commonly for all serving cells associated to the same eNB to maintain the Rel-10 CA operation. Except for the on Duration Timer, all events are related to grant, HARQ status or PCell. The mac-Contention Resolution Timer may be started when Msg3 is transmitted on the PCell for collision resolution. In this case, the active time may be enabled on the PCell only or for serving cells associated with the same eNB with PCell.

If the active time is independently managed, the different DRX related timer value can be configured per eNB. Alternatively, even if the active time is independently managed, the same DRX related timer value can be configured for all serving cells.

TABLE 1

Active Time Management

| Event | Condition for start of Event | Common or Independent |
|---|---|---|
| on Duration Timer is running | Subframe corresponding to DRX start offset and short or long DRX cycle | Common |
| DRX-Inactivity Timer is running | When the UE receives initial UL or DL grant | Independent |
| DRX-Retransmission Timer is running | When a HARQ RTT Timer expires in this subframe and the data of the corresponding HARQ process was not successfully decoded | independent |
| MAC-Contention Resolution Timer is running | When Msg3 is transmitted on the PCell | Only for serving cells associated with same eNB with PCell. |
| a Scheduling Request(SR) is sent on PUCCH and is pending | When SR is sent on PUCCH | independent |
| an uplink grant for a pending HARQ retransmission can occur | When there is a pending HARQ retransmission. | Independent |
| a PDCCH indicating a new transmission addressed to the C-RNTI of the UE has not been received after successful reception of a RAR for the preamble not selected by the UE | When Msg2 is received | Independent |

Figure 3:
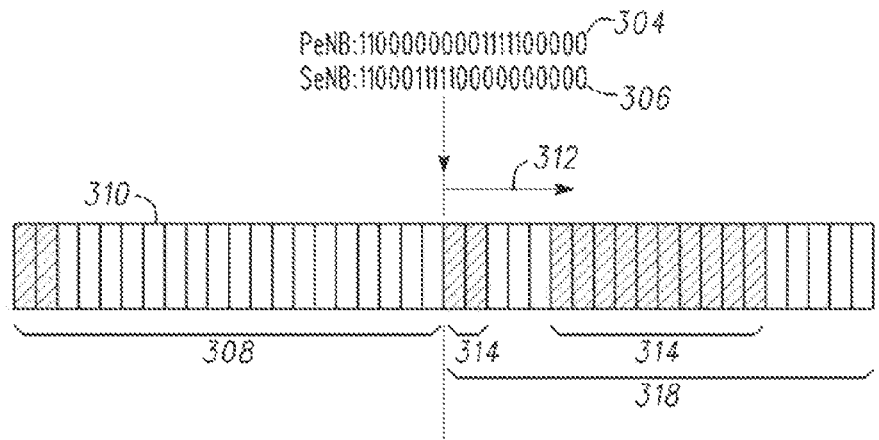
FIG. 3 illustrates the exchange of bitmaps for DRX active time determination in accordance with some embodiments.

FIG. 3 illustrates the exchange of bitmaps for DRX active time determination in accordance with some embodiments. In these embodiments, primary and secondary eNBs are configured to exchange information in the form of bitmaps that indicate their expected active times. The expected active time for the next interval is indicated by the union of both of these bitmaps.

In some of these embodiments, an eNB 104 operating as a primary eNB (PeNB) including a primary cell (PCell) may be configured to send a PCell bitmap 304 via an X2 interface 110 to a secondary eNB (SeNB) including a secondary cell (SCell). The PCell bitmap 304 may indicate an expected active time for the UE 102 for a first set of serving cells including the primary cell. The primary eNB 104 may also receive a SCell bitmap 306 via the X2 interface 110 from the secondary eNB. The SCell bitmap 306 may indicate an expected active time for the UE 102 for a second set of cells including the secondary cell.

The primary eNB 104 may determine a final active time 314 for a next time interval 312 based the combination (i.e., union) of both the PCell bitmap 304 and the SCell bitmap 306. The primary eNB 104 may also transmit a physical downlink control channel (PDCCH) during the final active time. Each bit of the PCell bitmap 304 and the SCell bitmap 306 may indicate whether a time interval 310 of a predetermined time period 308 is active. The predetermined time period 308 may be at least as great as an X2 interface delay time. In these embodiments, the final active time 314 includes times that either bitmap indicates as active, as illustrated in FIG. 2. Accordingly, the active times can be synchronized in inter-eNB carrier aggregation.

In some embodiments, multiple serving cells may be configured to belong to the primary eNB. In these embodiments, one of multiple serving cells may be the primary cell.

In some embodiments, an eNB, such as serving eNB 104, may indicate to peer eNBs (e.g., eNBs 106, 116) events which change the active time. In these embodiments, the serving eNB 104 may be engaged in inter-eNB carrier aggregation with a neighbor eNB 106. The serving eNB 104 may be configured to send an indication to a neighbor eNB 106 of an event that changes an active time of a DRX cycle for a UE. The indication may be sent over the X2 110 interface at least a predetermined period (e.g., X ms) before the active time is to be changed. The predetermined time period may be at least as great as an X2 interface delay time between the serving eNB and the neighbor eNB. In response to the indication, the neighbor eNB 106 may be to reconfigure the DRX cycle for the UE in accordance with the indication so that both the serving eNB and the neighbor eNB operate in accordance with the same DRX cycle for the UE.

In some embodiments, the indication may include an event type and a corresponding time stamp. The time stamp may indicate a system frame number and a subframe number at which the changes in the active time of the DRX cycle are to start. In some embodiments, the events may include one or more of an initiation of a new downlink or uplink transmission when an on-Duration Timer is not running, a retransmission which stops a DRX-Retransmission Timer, and/or a transmission of a DRX Command MAC control element. In these embodiments, the eNB may send events which change the active time to a peer eNB via X2 signaling.

In some embodiments, the time interval 310 may be a multiple of one or more subframes. The subframes may comprise subframes configured in accordance with a 3GPP LTE standard. In these embodiments, each subframe may be one millisecond (ms) long, although this is not a requirement.

In some embodiments, the primary eNB 104 may be arranged to send the PCell bitmap 304 to the secondary eNB 106 at least the predetermined time period 308 (e.g., X ms) before a start of the next time interval 312. The predetermined time period may be at least as great as an X2 interface delay time between the primary and secondary eNBs. The secondary eNB 106 may send the SCell bitmap 306 to the primary eNB 104 at least the predetermined time period 308 before the next time interval 312. Accordingly, the secondary eNB 106 will have the bitmap for the next time interval 312 prior to the start of the next time interval 312, and the primary eNB 104 will have the SCell bitmap for the next time interval 312 prior to the start of the next time interval 312. The X2 interface delay time may range from as little as 10 ms to as great as 20 ms or more.

In some embodiments, the primary eNB 104 and the secondary eNB 106 may exchange their bitmaps 304, 306 once every predetermined time period 308.

In these embodiments, the primary eNB 104 may determine the PCell bitmap 304 and may can estimate the possible active time based on own scheduling decision or DRX related parameters. The UE 102 determines the active time based on DRX related parameters and active time triggering events. The UE 102 may monitor the PDCCH every subframe if the subframe is considered as active time. The UE 102 may receive downlink data in a subframe which is designated as active time. The UE 102 may transmit uplink data when scheduled regardless of whether the uplink subframe is active or not. The active time may include one or more subframes 310.

In these embodiments, the UE 102 treats PDCCHs from the different eNBs as if it is from the same eNB. To be synchronized on the active time between eNBs, the eNBs exchange its scheduling behavior over the X2 interface 110. In the example illustrated in FIG. 3, the eNBs exchange the expected UE active time every time interval 308, which includes 20 sub-frames 310 totaling 20 ms. In this example, the expected active time is 20 bits. PeNB 304 refers to the eNB including the PCell and SeNB refers the eNB not including the PCell. As illustrated in FIG. 3, the union of the expected active time is the final active time for the next time interval 318 (e.g., for the next 20 ms).

Another issue with inter-eNB CA is uplink scheduling. Conventionally, different eNBs may schedule uplink (UL) transmissions independently. As a result, the aggregated UL transmission power of all serving cells may exceed a maximum allowed UL transmission power. The UE may need to scale down transmission power to comply with the power limitation and corresponding PUSCH or PUCCH performance may be degraded.

In accordance with some embodiments, eNBs may be configured to exchange the required transmission power for its own PUSCH scheduling and/or PUCCH transmission via the X2 interface 110 in a semi-static way. For example, a macro-eNB may indicate to a pico-eNB a maximum transmission power allowed in its set of pico-cells (e.g., $P_{ECG}$). Based on the configuration, the pico-eNB may set corresponding $P_{CMAX,c}$ for each serving cell. Alternatively, the eNBs may be configured with the allowed power headroom for their own PUSCH scheduling and/or PUCCH transmission via the X2 interface. The allowed power headroom may indicate an allowable amount of power increase with respect to the current transmit or receive power or with respect to a reference transmit or received power.

In some of these embodiments, a serving eNB, such as eNB 104 may be engaged in inter-eNB carrier aggregation (CA) with a neighbor eNB 106. In these embodiments, eNB 104 may exchange transmission power information for own PUSCH scheduling and/or PUCCH transmission over an X2 interface 110 with eNB 106. The transmission power information may include, for example, an indication of a maximum transmission power to be used by the neighbor eNB 106 within a set of serving cells associated with the neighbor eNB 106. The serving eNB 104 may be a macro-eNB and the neighbor eNB is a pico-eNB, although this is not a requirement.

Figure 4:
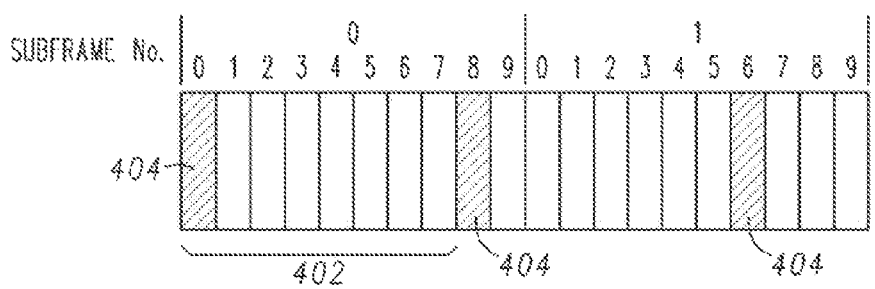
FIG. 4 illustrates time-domain multiplexing for uplink scheduling in accordance with some embodiments.

FIG. 4 illustrates time-domain multiplexing for uplink scheduling in accordance with some embodiments. In these embodiments, a time domain multiplexing (TDM) solution is provided. In these embodiments, for one UL subframe, the UE 102 may only transmit the PUSCH/PUCCH to one ECG (i.e. the serving cell(s) associated with one eNB). The eNBs may exchange information for a TDM partition the X2 interface 110. As illustrated in FIG. 4, a macro-eNB (an eNB associated with a macro-cell) may provide to a pico-eNB (an eNB associated with a pico-cell) a bitmap 402 that indicates the subframes 404 where the UE 102 will transmit to the serving cell(s) associated with the macro-eNB. Alternatively, the macro-eNB may provide the pico-eNB with DL bitmap that indicates where the macro-eNB will operate in the downlink. In some LTE embodiments, the timing between the PUSCH/PUCCH and a corresponding DL transmission follows a predefined rule and therefore such a DL bitmap may determine UL activity.

In some alternate embodiments, an eNB may exchange different bitmap (i.e., one bitmap for downlink scheduling and another bitmap other for uplink scheduling). Alternatively, for uplink scheduling, two different bitmaps may be exchanged (e.g., one for PUSCH transmissions and other for PUCCH transmissions).

In some of these embodiments, the length of a bitmap may take into account some factors including the HARQ timing relationship and/or period. In an example embodiment discussed below for frequency domain duplexing (FDD), an eight millisecond (ms) bitmap (i.e., "10000000") is used. When a pico-NB receives such a bitmap, it determines that the UE 102 may only transmit the PUSCH and/or the PUCCH to macro-cells in accordance with the bitmap (e.g. in (SFN #0, subframe 0 and 8), (SFN #1, subframe #6), etc. as shown in FIG. 4).

In these embodiments, a serving eNB 104 may be engaged in inter-eNB CA with a neighbor eNB 106. The serving eNB 104 may generate a bitmap to indicate subframes during which the UE 102 is to transmit to the serving eNB 104. The serving eNB 104 may provide the bitmap to the neighbor eNB 106 over an X2 interface.

In some other embodiments, an eNB 104 may use dynamic X2 signaling over the X2 interface 110 to exchange information related to UL scheduling. For example, whenever a macro-eNB is to transmit DL data or schedule the UE 102 to transmit UL data, the macro-eNB may notify pico-eNB via X2 signaling. In some embodiments, the notification information may include the subframe information (e.g., the SFN and subframe index of the event), the type of the event (e.g. a DL transmission or an UL transmission) and/or the UL transmission power.

In these embodiments, the serving eNB 104 may engage in dynamic X2 signaling over the X2 interface 110 to exchange information related to uplink scheduling. As part of the dynamic X2 signaling, the serving eNB 104 may notify the neighbor eNB 106 that the serving eNB 104 is to either transmit downlink data to schedule a UE to transmit uplink data. The notification may include one or more of subframe information, type of event and uplink transmission power. The subframe information may a subframe index. The type of event may include either a downlink transmission or an uplink transmission.

Another issue with inter-eNB CA is random access. When a pico-cell is added as one of the serving cells, UE 102 conventionally may perform a random access procedure to access the pico-cell. However there may be no communication between macro-cell and pico-cell, therefore macro-cell is not aware whether the random access to the pico-cell is successful or not.

When UE sends a random access preamble in SCell, a Random Access Response (RAR) may be sent from the PCell. In accordance with some embodiments for inter-eNB CA, the RAR may be transmitted from pico-cell (SCell) directly. In these embodiments, the pico-cell may be configured to transmit the RAR to the UE 102 and the UE 102 may be configured to monitor the PDCCH of the SCell for RAR reception.

In some embodiments, once the Random Access Preamble is transmitted and regardless of the possible occurrence of a measurement gap, the UE 102 may monitor the PDCCH of the PCell or SCell of the secondary ECG. The Random Access Preamble is transmitted in the corresponding SCell for Random Access Response(s) identified by the RA-RNTI, in the RA Response window which starts at the subframe that contains the end of the preamble transmission plus three subframes and has length ra-ResponseWindowSize subframes. Some of these embodiments may be performed in accordance with 3GPP TS 36.321, release 11 or later.

In some other embodiments, a pico-cell may be configured to perform Random Access Preamble detection and may reports the detected Random Access Preamble to the macro-cell (PCell) via X2 signaling. Then RAR may be transmitted from PCell. The X2 signaling may include the subframe and an index of the corresponding PRACH detected.

In accordance with embodiments, the macro-cell may be informed about random access has been successful or unsuccessful. In some of these embodiments, a pico-cell may inform macro-cell via X2 signaling. As described above, if the pico-cell indicates to the macro-cell about the detected Random Access preamble, the macro-cell determines that the random access is successful. In these embodiments, the pico-cell may also indicate to the macro-cell that the random access has failed when pico-cell cannot detect Random Access Preamble within a specified time (e.g. based on a timer).

In some other embodiments, the macro-cell may start a timer (e.g. picoRATimer) after it indicates to the UE 102 and the pico-cell that the UE 102 is to perform random access at the pico-cell. If the macro-eNB does not receive any indication either from pico-cell or from the UE 102, the macro-eNB may consider that random access to pico-cell failed.

In some other embodiments, after the UE 102 receives a RAR from the pico-cell, the UE 102 may report this information to the macro-cell. The UE 102 may report this information using physical layer signal (e.g. another Random Access Preamble), a MAC Control Element, or a new UL RRC message.

Another issue with inter-eNB CA is the buffer status report (BSR). In accordance with embodiments, the UE 102 may send a Scheduling Request (SR) to the eNB to inform the eNB that the UE 102 has an unspecified amount of data to send. The UE may send a BSR to report pending data in uplink buffers. In some embodiments, the BSR may inform the eNB that the amount of data that the UE 102 has to send is within a predefined range. The amount of data available may be specified for logical channel groups rather than individual bearers, although this is not a requirement. Conventionally, a short BSR is used only for the highest priority channel, which may not be optimized for inter-eNB CA operations. In accordance with these embodiments, the UE 102 may transmit a short BSR to each ECG independently. In other words, the UE 102 may transmit a short BSR to each eNB independently. Since the BSR is controlled by timers (e.g., a retxBSRTimer, and a periodicBSR-Timer), each ECG may have a separate timer. In these embodiments, when the UE 102 is configured with multiple ECGs due to inter-eNB CA, the UE 102 may maintain independent retxBSR-Timer and periodicBSR-Timer for each ECG.

In accordance with some embodiments, the UE 102 may perform a buffer status reporting procedure in which the UE 102 may consider all radio bearers which are not suspended and may consider radio bearers which are suspended. If the UE 102 is configured with multiple ECGs, the UE 102 may maintain independent retxBSR-Timer and periodicBSR-Timer for each ECG. In these embodiments, a Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

For Regular and Periodic BSR:

if more than one LCG belongs to the same ECG has data available for transmission in the TTI where the BSR is transmitted: report Long BSR;

else report Short BSR.

For Padding BSR:

if the number of padding bits is equal to or larger than the size of the Short BSR plus its subheader but smaller than the size of the Long BSR plus its subheader:

if more than one LCG belongs to the same ECG has data available for transmission in the TTI where the BSR is transmitted: report Truncated BSR of the LCG with the highest priority logical channel with data available for transmission;

else report Short BSR.

else if the number of padding bits is equal to or larger than the size of the Long BSR plus its subheader, report Long BSR.

In these embodiments, when the UE 102 is configured with multiple ECGs, the UE 102 may transmit a short BSR to corresponding ECG. Some of these embodiments may be performed in accordance with 3GPP TS 36.321, release 11 or later.

Figure 5:
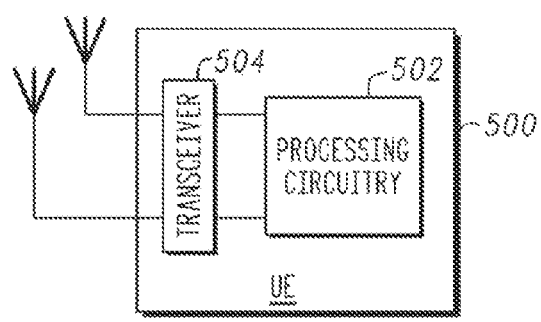
FIG. 5 illustrates a wireless communication device in accordance with some embodiments.

FIG. 5 is a functional block diagram of a UE in accordance with some embodiments. UE 500 may be suitable for use as UE 102 (FIG. 1) although other UE configurations may also be suitable. UE 500 may include a transceiver 504 for communicating with at least two or more eNBs and processing circuitry 502 configured to perform at least some of the operations described herein. UE 500 may also include a memory and other elements not separately illustrated. The processing circuitry 502 may also be configured to determine several different feedback values discussed below for transmission to an eNB. The processing circuitry may also include a media access control (MAC) layer. In some embodiments, the UE 500 may include one or more of a keyboard, a display, a non-volatile memory port, multiple antennas, a graphics processor, an application processor, speakers, and other mobile device elements. The display may be an LCD screen including a touch screen.

The one or more antennas utilized by the UE 500 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result between each of antennas and the antennas of a transmitting station.

Although the UE 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, the UE 500 may be configured to transmit and receive OFDM communication signals over a multicarrier communication channel in accordance with an OFDMA communication technique. The OFDM signals may comprise a plurality of orthogonal subcarriers. In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

In some embodiments, the UE 500 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some UTRAN LTE embodiments, the UE 500 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current channel, and the PMI indicates the codebook index of the precoding matrix (depending on the number of transmit antennas) that is applied at the transmitter. The code rate used by the eNB may be based on the CQI. The PMI may be a vector or matrix that is calculated by the UE and reported to the eNB. In some embodiments, the UE may transmit the PUCCH of format 2, 2a or 2b containing the CQI/PMI or RI.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An enhanced Node B (eNB) to operate as a serving eNB and engage in inter-eNB carrier aggregation with a neighbor eNB, the eNB comprising interface circuitry arranged to:
   send an indication to the neighbor eNB of an event that changes an active time for discontinuous reception (DRX) operations for user equipment (UE), the indication to be sent over an X2 interface at least a predetermined period before the active time is to be changed, the predetermined time period being at least as great as an X2 interface delay time between the serving eNB and the neighbor eNB, the X2 interface being used for communication between the serving eNB and the neighbor eNB; and
   instruct the UE to perform DRX operations in serving cells associated with the serving eNB in accordance with the changed active time,
   wherein in response to the indication, the neighbor eNB is to reconfigure DRX operations for the UE to perform DRX operations in serving cells associated with the neighbor eNB in accordance with the changed active time, the changed active time being a same active time for serving cells of both eNBs.

2. The serving eNB of claim 1 wherein the indication includes an event type and a corresponding time stamp, the time stamp indicating a system frame number and a subframe number at which the active time is to be changed.

3. The serving eNB of claim 2 wherein the event types include: an initiation of a new downlink or uplink transmission when an on-duration timer is not running; a retransmission which stops a DRX-retransmission timer; and a transmission of a DRX command media-access control (MAC) control element.

4. The serving eNB of claim 1 further configured to: configure a secondary cell to perform random access preamble detection and to report a detection of a random access preamble using X2 signaling; and either transmit a random-access response (RAR) to the UE within a primary cell or configure the secondary cell to transmit the RAR.

* * * * *